United States Patent [19]

Nardella et al.

[11] 4,227,140

[45] Oct. 7, 1980

[54] BATTERY CHARGER

[75] Inventors: Paul C. Nardella, N. Easton; Joseph D. Feeney, Carver; Thomas A. Wrublewski, Braintree; Anthony W. Gonsalves, Randolph, all of Mass.

[73] Assignee: Codman & Shurtleff, Inc., Randolph, Mass.

[21] Appl. No.: 878,494

[22] Filed: Feb. 16, 1978

[51] Int. Cl.³ .......................................... H01M 10/46
[52] U.S. Cl. .......................................... 320/2; 320/5; 429/99
[58] Field of Search ...................... 320/2, 3, 4, 5, 48; 429/1, 7, 9, 97, 99

[56] References Cited

U.S. PATENT DOCUMENTS

| | | | |
|---|---|---|---|
| 1,425,689 | 8/1922 | Powell | 320/48 |
| 3,183,891 | 5/1965 | MacDonald | 320/2 UX |
| 3,390,319 | 6/1968 | Robison | 320/2 |
| 3,579,075 | 5/1971 | Floyd | 320/2 |
| 3,694,729 | 9/1972 | Jones | 320/2 X |
| 3,973,179 | 8/1976 | Weber et al. | 320/2 |

FOREIGN PATENT DOCUMENTS 2308278  4/1976  France .......................................... 320/2

Primary Examiner—Robert J. Hickey

Attorney, Agent, or Firm—Donal B. Tobin

[57] ABSTRACT

An improved battery charger of the type having a housing with a source of electrical energy therein suitable for recharging units capable of being electrically recharged. The housing includes a plurality of cavities each arranged to accommodate a unit to be recharged, and each cavity has electrical contacts which are positioned to contact the terminals of the unit inserted into each cavity for delivering electrical energy to that unit. The improvement comprises a switch in each cavity which is activatable by insertion of the unit therein, the switch being separate from and free from direct contact with the electrical contacts, but electrically connected to the energy source which, in turn, energizes the electrical contacts for recharging the unit upon activation of the switch.

A battery pack unit capable of being recharged including a housing with a first pair of electrically conductive metallic strips on the outside of a side portion thereof, and a second pair of metallic strips on the outside of a top portion of the housing. A plurality of batteries is in the housing, the batteries being electrically connected to each other and to both pairs of the metallic strips. One of the strips in each pair is a negative terminal and the other strip in each pair is a positive terminal for the pack unit.

5 Claims, 6 Drawing Figures

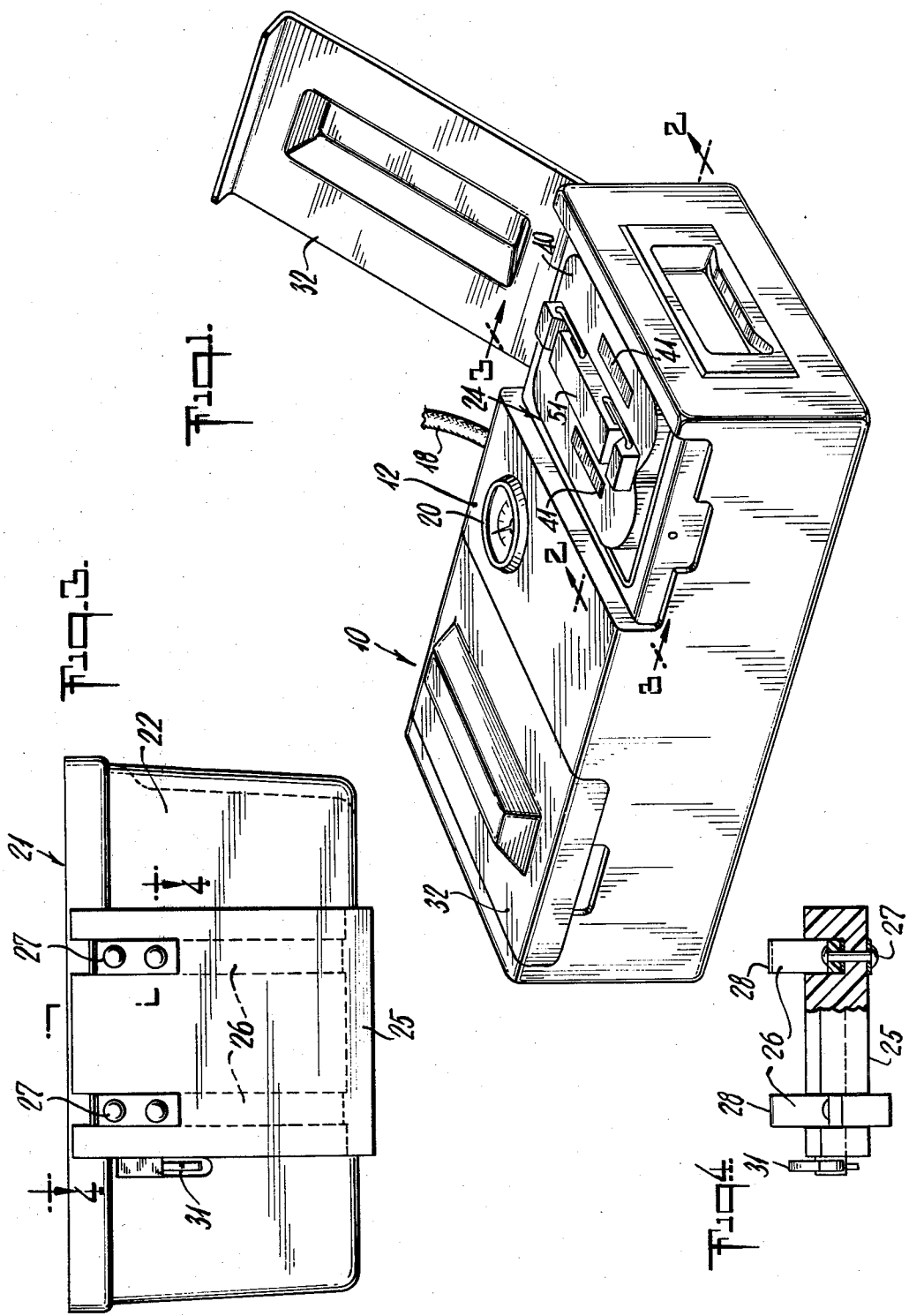

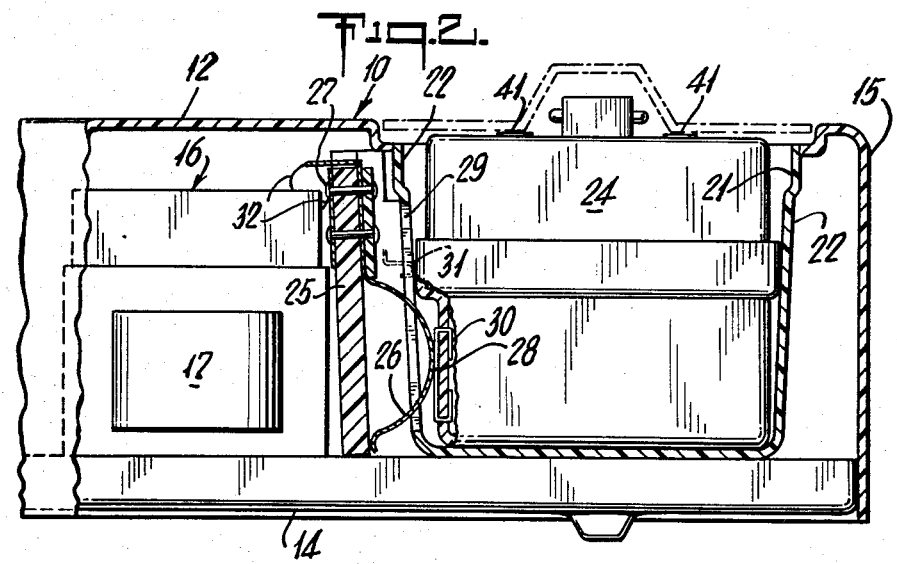
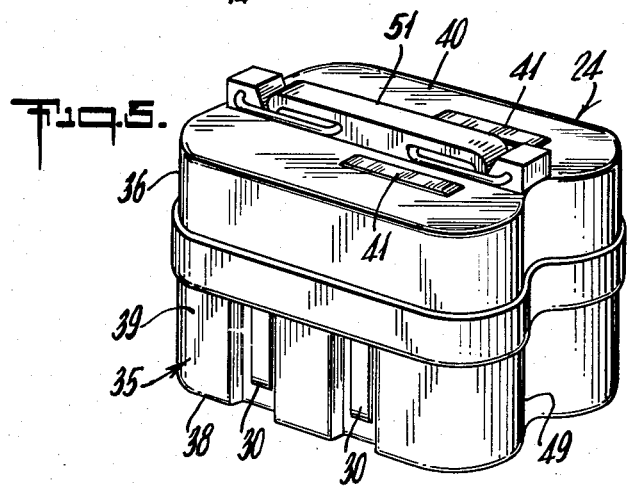
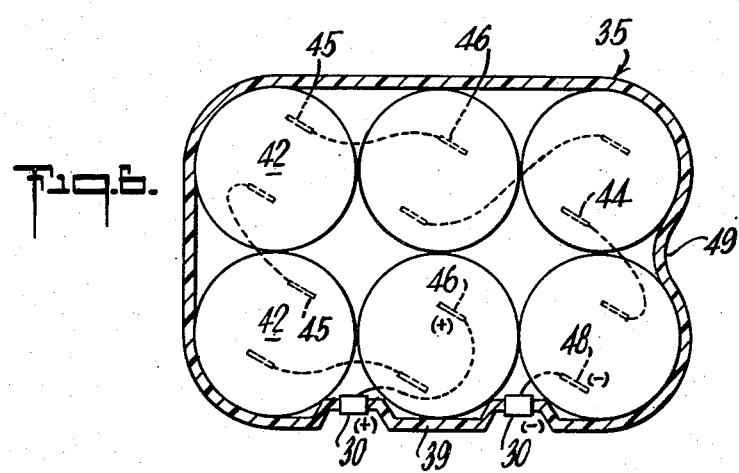

BATTERY CHARGER

BACKGROUND OF THE INVENTION

The present invention relates to a battery charger for recharging a battery, and, more particularly concerns a battery charger with improved switching means therein for providing energy to the rechargeable units. The present invention further relates to a battery charger for recharging a battery pack unit comprising a plurality of batteries, particularly of the secondary cell type, and the battery pack unit itself.

Batteries and other electrical energy storage devices often loose their efficiency and ability to provide energy following a heavy drain during their usage. Accordingly, devices to recharge batteries, either primary cells (dry cells) or secondary cells (rechargeable), are well known for this purpose. Many battery chargers are designed to receive the unit to be recharged in the housing of the charger itself, rather than merely connecting the recharging device by cable or wire to the battery. This not only allows compact design, but also makes for neater packaging. Examples of this type battery charger are disclosed in U.S. Pat. Nos. 3,579,075; 2,780,766; and 2,505,614. It is noted, however, in the recharging devices disclosed in the above patents that the battery terminals generally contact an electrical contact which resiliently moves to further contact an energized element so that energy can be provided from the recharger to the battery. This energizing actuation is commonly employed and relies upon the spring-resiliency of the contacts in order to allow the electrical current to flow into the battery. Furthermore, the previously known battery chargers were concerned with merely recharging one battery for each pair of electrical contacts in the recharger. In other words, a single battery would be received between opposed electrical contacts for the recharging operation. In this regard, there is room for improvement in the field of battery chargers especially in the means for activating the energy supply for passage of the same onto the unit which is to be recharged; and, room for improvement in the ability to recharge more than one battery for each pair of electrical contacts which contact the unit to be recharged.

SUMMARY OF THE INVENTION

The present invention comprises a battery charger of the type having a housing with means therein for providing electrical energy suitable for recharging units capable of being electrically recharged. The housing includes a plurality of cavities each arranged to accommodate a unit to be recharged, and each cavity has electrical contacts associated therewith which are positioned to contact the terminals of the unit inserted into each cavity for delivering electrical energy to that unit. The improvement comprises a switch in each cavity which is activatable by insertion of the unit therein. This switch is separate from and free from direct contact with the electrical contacts, but electrically connected to the energy providing means, which, in turn, energizes the electrical contacts for recharging the unit upon activation of the switch.

In the preferred embodiment of this aspect of the invention, the housing includes two cavities, each provided with two spring-resilient electrical contacts aligned in a side-by-side relationship, and projecting into each cavity for contact with the terminals of the unit to be recharged. A snap-action miniature switch also projects into each cavity for activation by insertion of the unit therein. This switch, upon activation, provides the electrical current flow through the spring-resilient contacts and then into the rechargeable unit. A pair of covers, one for placement over each of the cavities for protection thereof, is included on the housing; additionally, an energy-valve indicating meter, such as a voltmeter, is mounted on the outside surface of the housing to indicate the charged or recharged level of the units therein.

Another aspect of the present invention is the combination of a battery charger substantially as described above and a battery pack unit inserted in each cavity. The pack unit comprises a plurality of batteries electrically connected to each other; the pack unit has electrical terminals in contact with the electrical contacts in each cavity, the terminals being electrically connected to the batteries in order to deliver the recharging energy from the battery charger. The preferable battery pack unit has two metallic strips on a side portion thereof serving as the terminals for the unit, and, additionally, has two metallic strips on a top portion of the unit, which also serves as terminals. This arrangement allows contact of the terminals in more than one location, not only for recharging purposes, but for contacting the terminals during the use of the battery unit for delivering energy to the device being used.

A further aspect of the present invention concerns the battery pack unit itself, having substantially the same characteristics as described above, and preferably, including batteries of the secondary, rechargeable cell type. A handle is attached to the housing of the battery pack unit for conveniently lifting the same.

In accordance with this invention, a number of advantages are offered. The preferable electrical switching element eliminates the need to have resilient spring contacts touch the electrical switch by flexing upon insertion of the battery between the contacts; this is beneficial especially since contact of this type is prone to intermittence if oxidation or other corrosion forms. The preferable switch such as the snap-action type, is activated by touch of the unit being inserted into the cavity, the switch being electrically connected to the energy providing source which then allows electrical current to flow to the electrical contacts.

Another advantageous feature of the present invention is the design of the specific cavities to allow a unit having a plurality of batteries inserted therein. In this regard, not only can a greater number of batteries be recharged simultaneously, but the energy capacity of the pack unit can be increased significantly when the individual batteries are electrically connected together. This battery pack unit is conveniently inserted and lifted out of the recharging cavities by the user. If desired, the battery pack unit can be recharged by electrically contacting either of the pairs of electrical terminals, one pair preferably located on the side of the housing, the other pair preferably located on the top of the housing. This double pair terminal arrangement is additionally advantageous for use of the battery pack unit itself when energy is to be derived from the unit for operating a particular device.

BRIEF DESCRIPTION OF THE DRAWINGS

FIG. 1 is a perspective view illustrating the battery charger of the present invention including the preferable battery pack unit inserted in the recharging cavity;

FIG. 2 is a cross-sectional view taken along lines 2—2 of FIG. 1;

FIG. 3 is a cross-sectional view of the electrical contacts and switch arrangement taken along lines 3—3 of FIG. 1;

FIG. 4 is a top view of the electrical contacts and switch arrangement taken along lines 4—4 of FIG. 3;

FIG. 5 is a perspective view illustrating the preferred battery pack unit of the present invention; and FIG. 6 is a plan view of the preferred battery pack unit illustrating the batteries therein and the appropriate electrical connections.

DETAILED DESCRIPTION

While this invention is satisfied by embodiments in many different forms there is shown in the drawings and will herein be described in detail preferred embodiments of the invention, with the understanding that the present disclosure is to be considered as exemplary of the principles of the invention and is not intended to limit the invention to the embodiments illustrated. The scope of the invention will be pointed out in the appended claims.

Adverting to the drawings, particularly to FIGS. 1 and 2, there is illustrated a battery charger 10. This battery charger 10 is generally a rectangularly shaped, box-like housing 12 having a suitable base 14 for support and an enclosure member 15 which fits over base 14 and provides an enclosure for the internal components of housing 12. Furthermore, enclosure 15 is removable in order to allow access to the internal components and for ease of fabrication.

Within housing 12, and preferably in the central portion thereof, there is an electrical energy source 16 for providing the electrical current to the units to be recharged. Energy source 16 includes transformer 17 and the appropriate components, well known in the art, for providing a source of direct current which is sufficient and suitable to recharge battery units, particularly secondary, storage-type rechargeable cells. In the preferable embodiment of the battery charger, a source of AC energy 18 is provided to electrical energy source 16 in the housing; appropriate voltage rectifying devices are included in the electrical circuitry in order to convert the alternating current into direct current. A voltmeter 20 is also included in housing 12 so that the recharging level of the appropriate units can be indicated. Meter 20 is mounted so that its indicating face is on the outside surface of housing 12, but is electrically connected to electrical energy source 16 inside housing 12. If desired, more than one voltmeter or other energy-value indicating meters may be utilized in conjunction with this invention. A cavity 21 is included inside housing 12, one on each side of the internal electrical components and on the end portions of housing 12. Cavity 21, in this instance, is a receptacle or container which is mounted inside housing 12 so that its open end faces upwards. While the shape of cavity 21 is not significant, in this embodiment it is rectangularly shaped and is constructed as a deep, open-ended cup, with its open portion facing upwards; the walls 22 of cavity 21 may also have a slight taper toward the open end of the cavity. This cavity is designed to accommodate a battery to be recharged, and particularly a battery pack unit 24, the details of which will hereinafter be described.

Mounted adjacent the inside wall 22 of cavity 21, between that wall and electrical energy source 16, is a support pad 25. Support pad 25 is generally constructed of an electrically non-conductive material so that two spring-resilient electrical contacts 26 may be mounted thereon at 27 while being electrically isolated from each other. Spring contacts 26, each a thin metallic band having a smoothly curved portion 28 rising away from pad 25, are aligned in a side-by-side relationship as more clearly seen by referring to FIGS. 3 and 4. Together, electrical spring contacts 26 are mounted on support pad 25 so that curved portions 28 thereof project through corresponding openings 29 in wall 22 of the cavity. In this regard, curved portions 28 of electrical contacts 26 are located in the area where the inserted battery pack unit 24, and particularly its electrical terminals 30, can contact the same.

Also mounted on support pad 25 is a switch 31. Switch 31 is preferably the miniature snap-on type which is activated by axial movement of its button-like surface; i.e., when urged inwardly, the switch becomes activated, and when the inwardly acting force is released, a spring-loaded mechanism urges the button-like portion outwardly so that the switch becomes de-activated. In this regard, it is noted, especially referring to FIGS. 3 and 4, that switch 31 is separate from and free from direct contact with electrical contacts 26. Switch 31 is preferably mounted along-side one of the contacts 26, and is mounted so that its activatable portion projects through opening 29 in wall 22 of the cavity. Accordingly, switch 31 is positioned in the area of cavity 21 so that battery pack unit 24, upon its insertion, touches and thereby activates the same as described above. Although switch 31 is free from direct contact with electrical contacts 26, it is electrically connected to energy source 16 by appropriate wiring 32. Return wiring 33 provides a path of electrical current from energy source 16 to electrical contacts 26 to energize the same for recharging the battery pack unit after the switch has been activated. Conversely, when battery pack unit 24 is withdrawn, switch 31 is de-activated, thereby interrupting the flow of electrical current from energy source 16 to electrical contacts 26. Thus, when cavity 21 is not being used and no battery unit is positioned therein, electrical contacts 26 projecting into the cavity are not energized. This is desirable inasmuch as no current will be transmitted to any conductive item which may inadvertently be placed or dropped into the cavity.

A cover 32 is provided in conjunction with housing 12 for covering each cavity 21. Each cover 32 is preferably hingedly attached to the housing to provide convenient access to each cavity. Cover 32 not only protects battery pack unit 24 when inserted in the cavity, but also protects the internal parts of the cavity when the charger is not in use.

Turning to FIGS. 5 and 6, in conjunction with FIG. 1, there is illustrated the preferred battery pack unit 24 for insertion into cavity 21. Battery pack unit 24 is generally comprised of an electrically non-conductive housing 35 preferably fabricated in two portions, an upper portion 36 and a lower portion 38 for ease of manufacture and assembly. Housing 35 is preferably rectangularly shaped so as to include a side portion 39 and a top portion 40. On the outside surface of side portion 39 there is located a pair of electrically conductive metal strips 30. On the outside surface of top portion 40 there is another pair of metallic strips 41. Both pairs of strips 30 and 41 serve as the electrical terminals for battery pack unit 24. Inside nousing 35 there is a plurality of batteries 42, for example, six in number, preferably of the secondary, rechargeable cell type, and more particularly, sealed lead-acid cells. Batteries 42 each have electrically positive terminals 44 and electrically negative terminals 45. The batteries are electrically connected together, generally positive terminal 44 of one battery to negative terminal 45 of an adjacent battery, until they are all connected except for one positive terminal 46 on one battery and one negative terminal 48 on another battery. These free terminals 46 and 48 respectively, are then wired to both pairs of metallic strips 30 and 41 respectively, accordingly, one of the strips in each pair is a negative terminal and the other strip in each pair is a positive terminal for the unit. Thus, by having two sets of electrical terminals, the battery pack unit of the present invention can be electrically charged from either of two sides of the unit, or the battery pack unit may deliver energy by contact from either of two portions of the unit.

In FIGS. 5 and 6 in conjunction with FIG. 1, it is noted that battery pack unit 24 has an indentation 49 in one end surface. Corresponding to indentation 49 in the battery pack unit, there is a guide key or protuberance 50 in cavity 21 in the battery charger. Indentation 49 and key 50 assist in guiding the pack unit into the cavity so that the user must insert the pack unit so that terminals 30 face electrical contacts 26 in the cavity. To further assist in placing battery pack unit 24 in the cavity and for removing it conveniently, a handle 51 is attached to housing 35. This handle is the type which, when not being used, lies as flat as possible on top portion 40 of housing 35. This way it does not interfere with cover 32 of the battery charger when the pack unit is inserted in the cavity.

While many different materials may be selected to fabricate the battery charger and the battery pack unit, it has been found preferable to fabricate enclosure member 15 (the major part of housing 12), covers 32 and base 14 from a light weight plastic material, such as acrylonitrile-butadiene-styrene copolymer (ABS). The ABS enclosure and base are satisfactorily formed from materials having a thickness of ⅛ inch (0.32 cm.). Typical, but not limiting, dimensions of battery charger 10, in order to recharge a pair of battery pack units 24 substantially as described above, may be 16 by 9 inches by about 5 inches high (41 by 23 by 12.5 cm.). In the same vein, battery pack unit 24 is also preferably made from a light weight, electrically non-conductive material such as ABS. From the dimensional standpoint, a typical battery pack unit having six sealed lead-acid cells (2 volts each nominal), can be packaged in a housing approximately 5¾ by 4 inches by about 4 inches high (14.5 by 10 by 10 cm.).

In operation, cover 32 of battery charger 10 is lifted by the user to gain access to cavity 21. Battery pack unit 24, grasped by handle 51 thereof, is properly inserted in cavity 21. Upon insertion wall 22 of battery pack 24 engages and activates switch 31 thereby opening the flow of electrical current to electrical contacts 26. Insertion of battery pack 24 also causes surface to surface contact between each of metallic terminals 30 and a corresponding electrical contact 26. When battery pack 24 is firmly seated in cavity 21 the spring force of contacts 26 maintain contact of curved portion 28 with corresponding electrical terminals 30 on the battery pack. Accordingly, with switch 31 activated and electrical current energizing contacts 26, battery pack 24 then receives the recharged energy from the energy source in the battery charger. Both cavities 21 of the battery charger operate in substantially the same fashion.

It is noted that, during recharging, terminals 41 on the top of battery pack unit 24 are not being used. Terminals 41 find more suitable use in conjunction with a canister for holding a battery pack unit such as described herein. This canister will make contact with the battery pack unit from the top in order to derive energy from the pack unit for providing that energy to a suitable device. The description of this kind of canister in conjunction with the battery pack unit of the present invention is found in the co-pending patent application filed on even date with the herein invention.

Thus, the present invention provides a battery charger with improved means of actuating the energy source which energizes the electrical contacts for recharging the battery unit. Moreover, the present invention provides a battery charger and a novel battery pack wherein a plurality of batteries may be charged together using one pair of electrical contacts; and, the battery pack unit is provided with a pair of electrical terminals on two different portions of the pack unit housing so that the unit may be charged from either of two sides, or the unit may provide energy from either of two sides, thereby increasing its adaptability to be used in different modes.

What is claimed is:

1. A battery charger comprising:
a housing having means therein for providing electrical energy suitable for recharging units capable of being electrically recharged,
said housing having at least one energy value indicating meter mounted on an outside surface thereof,
said meter adapted to indicate the recharged level of said unit,
said housing including two cavities therein each arranged to accommodate a unit to be recharged and defined by a bottom, two opposed side walls, and two opposed end walls;
two curved, resilient, electrical contact, leaf springs each having a pronounced arc projecting through one of said end walls into each cavity;
said recharging units having recesses in a side wall thereof aligned with said contact springs;
contact terminals disposed in said recesses of said unit inserted into each cavity and positioned to deflect said contact springs sufficiently to provide good electrical contact therebetween to deliver electrical energy to said unit whereby good electrical contact is provided between said contact springs and said terminals but without placing the entire weight of the units on the contact spring;
a switch projecting into each cavity activatable by insertion of the unit therein, said switch being separate from and free from direct contact with said electrical contacts but electrically connected to said energy providing means which, in turn, energizes said electrical contacts for recharging the unit upon activation of said switch;
and a pair of covers, one for placement over each of said cavities for protection thereof.

2. A battery charger as defined in claim 1 wherein said electrical spring contacts are aligned in a side-by-side relationship.

3. A battery charger as defined in claim 2 which further includes said switch aligned alongside of one of said contacts, said contacts and said switch all being mounted on a support pad located adjacent said cavity so that said contacts and said switch project through one wall of said cavity into the area where the inserted unit can contact the same.

4. In combination, a battery charger having a housing with means therein for providing electrical energy suitable for recharging units capable of being electrically recharged, said housing including a plurality of cavities each arranged to accommodate a unit to be recharged, each of said cavities having a pair of resilient, metallic springs arranged side-by-side to project into said cavity and to serve as electrical contacts for contacting electrical terminals of said unit in each cavity for delivering electrical energy to said unit, each of said cavities having means responsive to insertion of said unit into each cavity for energizing said electrical contacts for providing energy for recharging; and a battery pack unit inserted in each cavity, said pack unit comprising a plurality of batteries electrically connected to each other, said pack unit having a first pair of metallic strips on the outside wall thereof serving as electrical terminals in contact with said electrical contacts, said strips positioned to align with and contact said metallic springs projecting into said cavity, said unit having a second pair of metallic strips remotely positioned on said pack unit so as not to be in contact with said electrical contacts of said charger, all of said strips being electrically connected to said batteries in order to deliver the recharging energy from said battery charger.

5. A combination as defined in claim 4 wherein said energizing means is a switch which is electrically connected to said energy providing means and which, when activated, allows electrical current to flow to said electrical contacts for energizing the same.

* * * * *